(12) United States Patent
Kawano et al.

(10) Patent No.: US 7,841,000 B2
(45) Date of Patent: Nov. 23, 2010

(54) AUTHENTICATION PASSWORD STORAGE METHOD AND GENERATION METHOD, USER AUTHENTICATION METHOD, AND COMPUTER

(75) Inventors: Seiichi Kawano, Sagamihara (JP); Yuji Sugiyama, Tokyo (JP); David Carroll Challener, Raleigh, NC (US); Philip Lee Childs, Raleigh, NC (US); Norman Arthur Dion, II, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1073 days.

(21) Appl. No.: 11/581,319

(22) Filed: Oct. 16, 2006

(65) Prior Publication Data

US 2008/0092216 A1    Apr. 17, 2008

(51) Int. Cl.
*G06F 17/30* (2006.01)
(52) U.S. Cl. .............................. 726/18; 726/5; 713/165; 713/166; 713/168
(58) Field of Classification Search .................. 726/18, 726/5; 713/168, 165, 166; 380/268
See application file for complete search history.

(56) References Cited

U.S. PATENT DOCUMENTS

| | | | | |
|---|---|---|---|---|
| 6,651,168 B1 * | 11/2003 | Kao et al. | ................... | 713/185 |
| 7,185,364 B2 * | 2/2007 | Knouse et al. | .................. | 726/8 |
| 7,373,451 B2 * | 5/2008 | Lam et al. | ....................... | 711/6 |
| 7,430,758 B2 * | 9/2008 | Toutonghi | ....................... | 726/5 |
| 2001/0037469 A1 * | 11/2001 | Gupta et al. | ................. | 713/202 |
| 2003/0177364 A1 * | 9/2003 | Walsh et al. | ................. | 713/182 |
| 2003/0182103 A1 * | 9/2003 | Atkin | ............................. | 704/9 |
| 2005/0071645 A1 * | 3/2005 | Girouard et al. | ............ | 713/183 |
| 2005/0091213 A1 * | 4/2005 | Schutz et al. | ................... | 707/9 |
| 2005/0254650 A1 * | 11/2005 | Sakurai et al. | .............. | 380/268 |
| 2007/0169174 A1 * | 7/2007 | Critten et al. | ................... | 726/3 |
| 2008/0046827 A1 * | 2/2008 | Sibley et al. | ................. | 715/751 |

FOREIGN PATENT DOCUMENTS

| | | |
|---|---|---|
| JP | 2000-047983 | 2/2000 |
| JP | 2005-3039993 | 10/2005 |

OTHER PUBLICATIONS author: Keith Brown Title: Customizing GINA part 1 and part 2 Date; Jun. 2005.*

* cited by examiner

*Primary Examiner*—Thanhnga B Truong
(74) *Attorney, Agent, or Firm*—John L. Rogitz

(57) ABSTRACT

Protection of an authentication password stored in a database held by a SAM of Windows® is strengthened. A GINA, a part of the OS, receives an authentication password in ASCII codes. The authentication password is converted to first UNI-CODES, and the first UNICODES are salted with a random number and converted to second UNICODES. The random number used for salting is associated with a user account and a password and stored in a read/write protected non-volatile memory or a non-volatile memory which can be accessed only by a BIOS. An LSA of the OS can process UNICODES without being changed.

16 Claims, 15 Drawing Sheets

(A) INPUTTED PASSWORD (ASCII CODES)

(B) FORMAT-CONVERTED PASSWORD (UNICODES)

(C) SALTED VALUE WITH THE SAME NUMBER OF DIGITS AS (B)

(D) = (B) XOR (C)

(E) CODE NUMBERS WHICH DO NOT EXIST AMONG UNICODES

FIG. 10
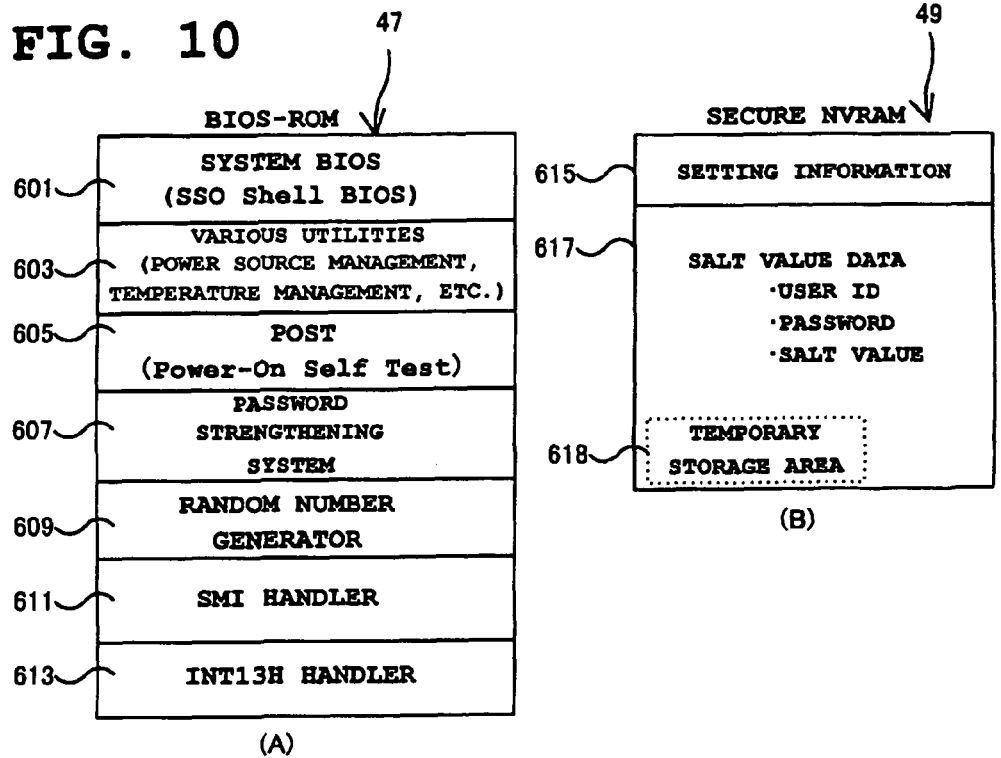
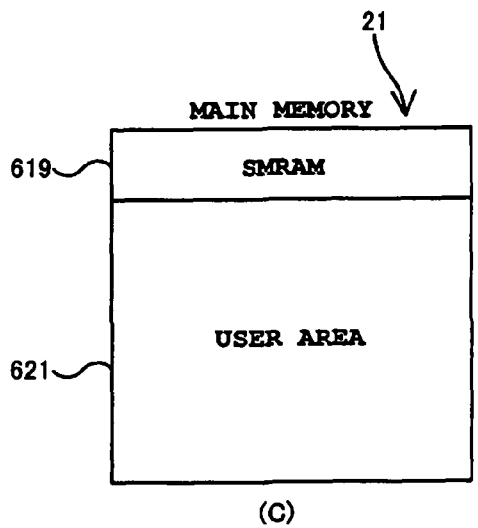

AUTHENTICATION PASSWORD STORAGE METHOD AND GENERATION METHOD, USER AUTHENTICATION METHOD, AND COMPUTER

BACKGROUND OF THE INVENTION (1) Field of the Invention

The present invention relates to strengthening protection from attacks against an authentication password stored in a computer having an operating system without making any change in the basic modules of the operating system.

(2) Description of Related Art

In a personal computer (hereinafter referred to as a PC), a multi-user operating system (hereinafter referred to as an OS), such as Windows NT/2000/XP (trademarks of Microsoft Corporation), is generally used. When the PC is powered on and the OS is activated after each device is initialized by a BIOS (Basic Input/Output System), a user inputs a user account (hereinafter referred to as a user ID), which is authentication information, and an authentication password to log on the OS.

FIG. 14 is a conceptual diagram showing a conventional user logon mechanism in Windows. When the operating system is activated, three desktop screens, that is, an application desktop 1001, which is a screen to be usually displayed when a user is logged into the OS, a screen saver desktop 1003 for displaying a screen saver, a WinLogon desktop 1005 for displaying a logon screen are created. It is always only one of the desktop screens that is displayed on the display. The WinLogon desktop 1005 is a component for performing logon session management, switching of the desktop screen displayed on the display, and the like.

The screen for requesting input of a user ID and a password which is to be displayed when the OS is activated is, in the context of Windows, the WinLogon desktop 1005. It is a component called a GINA (Graphic Identification and Authentication) 1009 of the OS that displays a dialog for inputting a user ID and a password. When the user inputs a user ID and an authentication password in a dialog 1011 displayed by the GINA, the inputted user ID and authentication password are passed from the GINA 1009 to a component called LSA (Local Security Authority) 1013. The LSA functions as an agent for processing logon by and authentication of a user on a local computer. In this case, in order to pass the user ID and the authentication password from the GINA 1009 to the LSA 1013, two APIs (Application Program Interfaces), that is, LogonUser and LsaLogonUser, can be used. For LogonUser, only a user ID and an authentication password of one-byte alphanumeric characters described in ASCII codes can be inputted, while, for LsaLogonUser, only a user ID and an authentication password described in UNICODE can be inputted. Usually, LogonUser is used, and a user inputs a user ID and an authentication password of one-byte alphanumeric characters.

The LSA 1013 passes the user ID and the authentication password to an AP (Authentication Package) 1015. A component called an SAM (Security Account Manager) 1017 holds a user account database 1019. A user ID and a hashed password are stored in this database. The AP 1015 hashes the authentication password received from the LSA 1013, retrieves the user ID which has also been received from the LSA 1013 and the hashed authentication password from the user account database 1019, and authenticates whether the user who has inputted the user ID and the authentication password is an authorized user. The term "hash" used here means to convert data with a one-way function called a cryptographic hash function. If the authentication is successful, WinLogon 1007 switches the desktop screen displayed on the display to the application desktop 1001. The user account database is stored in a magnetic disk as a system file of the OS while the OS is not activated, and it is copied in the registry and used when the OS is activated.

The user authentication mechanism shown above is specified as standard specifications of Windows. Further, a mechanism for customizing user authentication has been released for developers. When a third party has to customize user authentication, it is common to create a unique GINA and register it as a component of the OS. By creating a unique GINA and passing a user ID and an authentication password from the GINA to LSA, it is possible to realize customized unique user authentication without changing the other components related to user authentication. In addition, there has also been released a method for creating a unique AP so that a third party can create a user authentication mechanism for developers. However, this method is not often used for an actual product because it requires a lot of effort in comparison with creation of a GINA.

There are documents as described below about a technique about user authentication. Japanese Patent Laid-Open No. 2005-303993 discloses a technique for synchronizing user authentication information (credential) with that on a server. Japanese Patent Laid-Open No. 2000-47983 discloses a technique for replacing a logon screen with a custom-built login screen after a user logs on by a DOS network logging session.

As described above, it is common that a user who is going to log on inputs a user ID and an authentication password of one-byte alphanumeric characters described in ASCII codes. It is desirable that the password is a character string which can be remembered only by each user and which cannot be inputted by other users. However, usually, a password constituted by a combination of meaningful English words, numeric characters and the like is often used. Therefore, such conventional user ID and authentication password are easily subject to a dictionary attack. The dictionary attack is one of attack approaches which are most frequently used for identification of a password or decryption, in which passwords generated by arbitrarily combining a word in a dictionary with a numeric character or the like are sequentially inputted and tried. If a password is generated by combining words with the use of a dictionary, the number of times of trial can be lower in comparison with generation of a password by combining characters one by one, so that a password can be identified in a shorter time. An algorithm, a tool, a dictionary in which words are re-arranged in usage frequency order, and the like can be easily obtained through the Internet.

FIG. 15 is a conceptual diagram showing a method for performing a dictionary attack against the user account database 1019. When the OS is not activated, the user account database 1019 is stored as one of system files. Further, the filename and the position in the magnetic disk are disclosed. Therefore, by activating an OS different from Windows® which authenticates an authentication password, for example, by installing a different OS such as Linux in the computer or activating a different OS from a floppy disk or an optical disk, the file in the user account database 1019 can be copied. This database 1019 includes a user ID 1109, which is not encrypted, and a hashed authentication password 1111, and the data structure is disclosed for developers. Furthermore, the specification of a hash function 1107 (for example an LM hash, an NT hash or the like) for hashing an authentication password is also disclosed for developers.

A dictionary-attack password-identification tool 1101 disclosed on the Internet and the like generates a lot of passwords 1105 by combining words picked up at random from a dictionary 1103 which is also disclosed on the Internet and the like. Then, the generated passwords 1105 are sequentially hashed by a known hash function 1107, and it is checked whether they correspond to the password 1111 included in the user account database 1019. Thus, it is easily possible to identify the password from the copy of the file in the database 1019 by the dictionary attack.

In order to make it difficult to identify a password by a dictionary attack, it is recommended to take measures such as avoiding use of a word having a meaning like those described in a dictionary as an authentication password, using a character string obtained by randomly combining symbols or numeric characters, increasing the number of characters used for the authentication password, periodically changing the authentication password, and the like. However, such a password as described above is difficult for a man to remember and lacks user-friendliness. An authentication password which a user inputs when he logs on tends to be constituted by words having meanings of one-byte alphanumeric characters described in ASCII codes. Meanwhile, as a user authentication method to be substituted for a password, biometric information such as a fingerprint, a vein and an iris, or electronic information stored in a medium such as a smart card or a token are increasingly frequently used. However, authentication using such biometric information or electronic information requires a dedicated input device or the like, and such a PC that it is reflected on the cost is expensive.

Microsoft Corporation provides a function of encrypting and storing a user account database while the main OS is not operating, which is called a system key utility (Syskey), as a solution for the above problem. It is difficult to acquire a user ID and a hashed authentication password and the like from the encrypted database. A key for encrypting the database is stored as an authentication password of a character string or a storage medium such as a floppy( disk so that it can be inputted when the OS is activated. However, this method provides only one key to one PC. Therefore, especially when Windows® is used by multiple users, it is necessary for the users to share the password or the storage medium which is the key, and this is inconvenient.

The object of the present invention is to provide an authentication password storage method and an authentication method for which protection from an attack against an authentication password for Windows® inputted and stored in a computer in ASCII codes is strengthened. Another object of the present invention is to provide a computer which realizes such a storage method or authentication method. Another object of the present invention is to provide a method for a computer to generate storage data in which the authentication password for Windows® is to be stored.

BRIEF SUMMARY OF THE INVENTION

A first aspect of the present invention is to provide a method for a computer to store an authentication password for an OS constituted by ASCII codes. A GINA of the OS receives an authentication password constituted by ASCII codes and converts the received authentication password to UNICODE data salted with random number. The UNICODE data is further hashed by an AP (Authentication Package) of the OS and stored in a user account database held by an SAM (Security Account Manager). As a result, in comparison with hashing ASCII codes and then storing them in a user account database as conventionally performed, protection from a dictionary attack can be strengthened by the portion which has been converted to UNICODE data before being hashed to increase the number of bytes and the portion salted with a random number unique to the system which is set for each user.

When generating the UNICODE data, the GINA converts the ASCII codes to first UNICODE data and salting the converted first UNICODE data with a random number to generate second UNICODE data. Salt is commonly a function used for encryption, such as DES and MD5, and is auxiliary information used when a plain text is encrypted. However, salting stated here is to process the first UNICODE with the use of a random number and generate data with the same number of digits. The salted first UNICODE data is UNICODE data constituted only by UNICODE characters other than the characters of the first UNICODE data or data including characters which are not included among UNICODES. In the present invention, the GINA is also provided with a function of converting the data including characters which are not included among UNICODES to UNICODE data.

If the data obtained by salting the first UNICODE data includes a character which is not included among UNICODES, the GINA converts the data to second UNICODE data constituted only by UNICODE characters with the use of a conversion table for mapping which includes code numbers and characters corresponding to the code numbers. In this case, it is also possible to replace a character which is included in the salted data and which does not exist on the conversion table with a character existing on the conversion table and having the nearest code number. Thereby, the salted first UNICODE data becomes the second UNICODE data constituted only by characters existing as UNICODES, and therefore, it is possible to perform input into the Authentication Package within a scope guaranteed by the OS.

Because UNICODES are character codes obtained by integrating a lot of languages used in the whole world into one system, characters of multiple languages are mixed in a UNICODE format authentication password salted with a random number, and the possibility that a character string equal to a word appearing in a dictionary is used is extremely low. Accordingly, even if a user account database is acquired by an attacker, the risk of an authentication password being identified by a dictionary attack is reduced. When a user is caused to input a UNICODE data authentication password, he tends to constitute a character string having a meaning with kanji, for example, and it is conceivable that resistance to a dictionary attack may be reduced. However, the present invention does not have such a problem because a user can use ASCII codes for an authentication password. Since the user can use an authentication password of a character format he is familiar with, convenience is not reduced. By customizing or adding the GINA, the method according to the present invention can be performed while the basic modules such as the Authentication Package, the SAM and the user account database are used as they are. Of course, a dedicated input device or the like is not required.

The random number used for salting an authentication password is associated with a user ID inputted by a user and stored in a read/write protected non-volatile memory or a non-volatile memory which can be accessed only by the BIOS. The random number can be also stored inside a TPM (Trusted Platform Module). Thereby, the stored random number is difficult to be acquired by an OS or the like different from Windows® related to the user authentication, and therefore, the risk of the password being identified by an attacker is further reduced.

A second aspect of the present invention provides a method for authenticating each of multiple users by inputting an authentication password constituted by ASCII codes and a user account in a multi-user OS. A list of random numbers corresponding to the user accounts of the respective users is stored in a computer. It is desirable to select a secure storage location which cannot be easily accessed by a third person. Data related to user authentication passwords is stored in the user account database held by the SAM (Security Account Manager) of the OS. The data related to authentication passwords is data obtained by encrypting authentication passwords.

The GINA of the OS receives a user account and an authentication password constituted by ASCII codes. The GINA converts the received authentication password to UNICODE data salted with a random number corresponding to the user account. The converted UNICODE data is hashed, and the Authentication Package performs user authentication by comparing the hashed UNICODE data with data related to the user's authentication password, which is stored in the user account database held by the SAM (Security Account Manager). In the user account database, there is stored data related to an authentication password obtained by hashing UNICODE data salted with a random number corresponding to each user's user account, which has been obtained from ASCII codes.

The characteristic of each aspect of the present invention described above is that all the work of converting an authentication password constituted by ASCII codes to salted UNICODE data is performed by the GINA. In another aspect of the present invention, a module other than the GINA converts an authentication password constituted by ASCII codes to UNICODE data, and passes data obtained by salting the UNICODE data to the GINA. If the salted data is constituted only by UNICODE characters, then the GINA regards it as the UNICODE data. If a character other than UNICODE characters is included in the salted data, then UNICODE data constituted only by UNICODE characters is generated. The UNICODE data is hashed and stored in the user account database. If the hashed UNICODE data is stored in the user account database in advance together with a corresponding user account, then the Authentication Package of the OS can perform authentication processing by comparing the hashed UNICODE data generated when the ASCII authentication password is inputted from the GINA and the hashed UNICODE data stored in the user account database. Another aspect of the present invention provides a computer which realizes the authentication password storage method and the user authentication method. Still another aspect of the present invention provides a method for a computer to generate storage data in which an authentication password for OS is to be stored.

According to the present invention, it is possible to provide an authentication password storage method and an authentication method for which protection from an attack against an authentication password for an OS inputted in ASCII codes and stored in a computer is strengthened. Furthermore, it is also possible to provide a computer which realizes the storage method and the authentication method. Furthermore, it is also possible to provide a method for a computer to generate storage data in which an authentication password for the OS is to be stored.

BRIEF DESCRIPTION OF THE DRAWINGS

FIG. 10 shows the internal configuration of a BIOS flash ROM, an NVRAM and a main memory in the second embodiment;

DETAILED DESCRIPTION OF THE INVENTION

Figure 1:
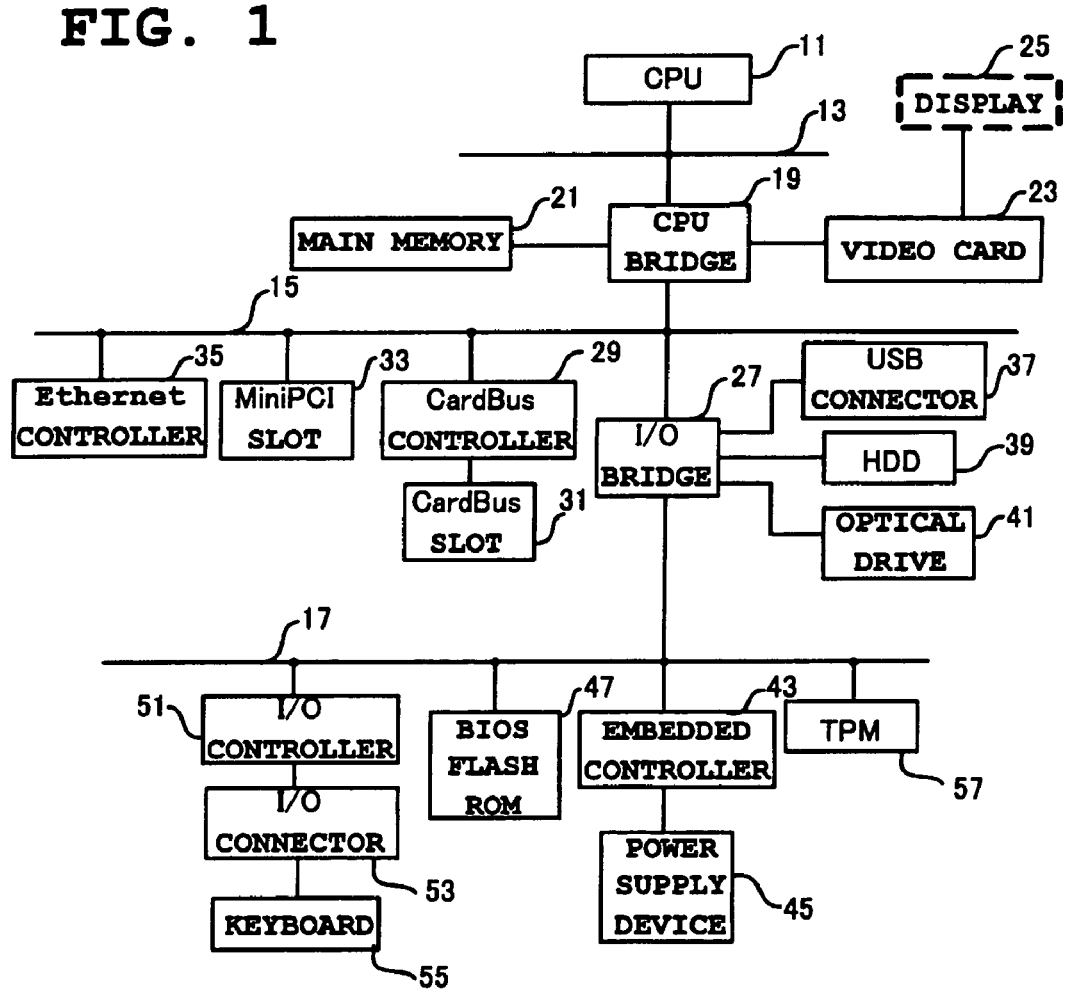
FIG. 1 is a schematic block diagram of a PC according to a first embodiment.

FIG. 1 is a schematic block diagram showing the system configuration of a PC 10 according to a first embodiment of the present invention. Inside the case of the PC 10, various devices shown in FIG. 1 are mounted. A CPU 11 is a processing unit responsible for key functions of the PC 10 and executes the OS, the BIOS, device drivers, application programs and the like. This embodiment is presently applied to any of Windows® NT, 2000 and XP and is not applied to 98 and those before 98. The CPU 11 according to this embodiment can be caused to operate in an SMM (System Management Mode), which is an operation mode for system management, by an SMI (System Management Interrupt) input pin (SMI#) being asserted. In the SMM, an SMI handler, which is an interrupt control handler existing in a CPU manufactured by Intel Corporation, is executed in a specially allocated memory space. The SMM is a privileged execution mode mainly used for suspend, resume, power management, security-related operations and the like.

The CPU 11 is connected to each device to send and receive signals via buses of three stages, that is, an FSB (Front Side Bus) 13 as a system bus, a PCI (Peripheral Component Interconnect) bus 15 for performing communication between the CPU 11 and peripheral equipment, and an LPC (Low Pin Count) bus 17, which is an interface substituting for an ISA bus. The FSB 13 and the PCI bus 15 are connected via a CPU bridge 19 which is called a memory/PCI chip. The CPU bridge 19 is configured to include a memory controller function for controlling operation of accessing a main memory 21, a data buffer function for absorbing data transfer speed difference between the FSB 13 and the PCI bus 15, and the like. The main memory 21 is a writable memory used as an area where a program to be executed by the CPU 11 is read and a work area where data to be processed is written. The main memory 21 also includes an area as an SMRAM (System Management RAM) which can be exclusively used by the CPU 11 operating in the SMM. A video card 23 has a video chip (not shown) and a VRAM (not shown). In response to a rendering command from the CPU 21, it generates an image to be rendered and writes it into the VRAM, and it sends an image read from the VRAM to a display 25 as rendering data.

To the PCI bus 15, each of an I/O bridge 27, a CardBus controller 29, a miniPCI slot 33, and an Ethernet( controller 35 is connected. The CardBus controller 29 is a controller for controlling data transfer between the PCI bus 15 and a PC card (not shown). A CardBus slot 31 is connected to the CardBus controller 29, and a PC card (not shown) is mounted in the CardBus slot 31. In the miniPCI slot 33, for example, a miniPCI card (not shown) including a wireless LAN module is mounted. The Ethernet( controller 35 is a controller for connecting the PC 10 to a wired LAN.

The I/O bridge 27 is provided with a bridge function between the PCI bus 15 and the LPC bus 17. The I/O bridge 27 is also provided with an IDE (Integrate Device Electronics) interface function, and a hard disk drive (HDD) 39 and an optical drive 41 (a CD drive, a DVD drive and the like) are connected thereto. A USB connector 37 is connected to the I/O bridge 27. Various peripheral equipment (not shown) compatible with USB is connected to the USB connector 37. To the LPC bus 17, there are connected an embedded controller 43, a BIOS flash ROM 47, a TPM (Trusted Platform Module) 57, and an I/O controller 51. To the I/O controller 51, there are connected input/output equipment (not shown) including a keyboard 55 via an I/O connector 53. The BIOS flash ROM 47 and the TPM (Trusted Platform Module) 57 will be described later.

The embedded controller 43 is a micro computer configured by 8 to 16 bit CPU, ROM, RAM and the like, and is provided with an AD input terminal, a D/A output terminal and a digital input/output terminal for multiple channels. To the embedded controller 43, there are connected a cooling fan (not shown), a temperature sensor (not shown), a power supply device 45 and the like via the input/output terminals, and it is possible to cause a program related to management of the operating environment inside the PC to operate independent from the CPU 11.

FIG. 1 only shows simplified configuration of and connection relationships among main hardware related to this embodiment in order to describe this embodiment. In addition to those that have been referred to in the description, a lot of devices are used to constitute the PC 10. However, since such devices are well known to those skilled in the art, they are not referred to in detail here. Of course, replacement of multiple blocks shown in the figure with one integrated circuit or device and configuration made by dividing one block into multiple integrated circuits or devices are also included in the scope of the present invention within the range that those skilled in the art can arbitrarily select it.

Figure 2:
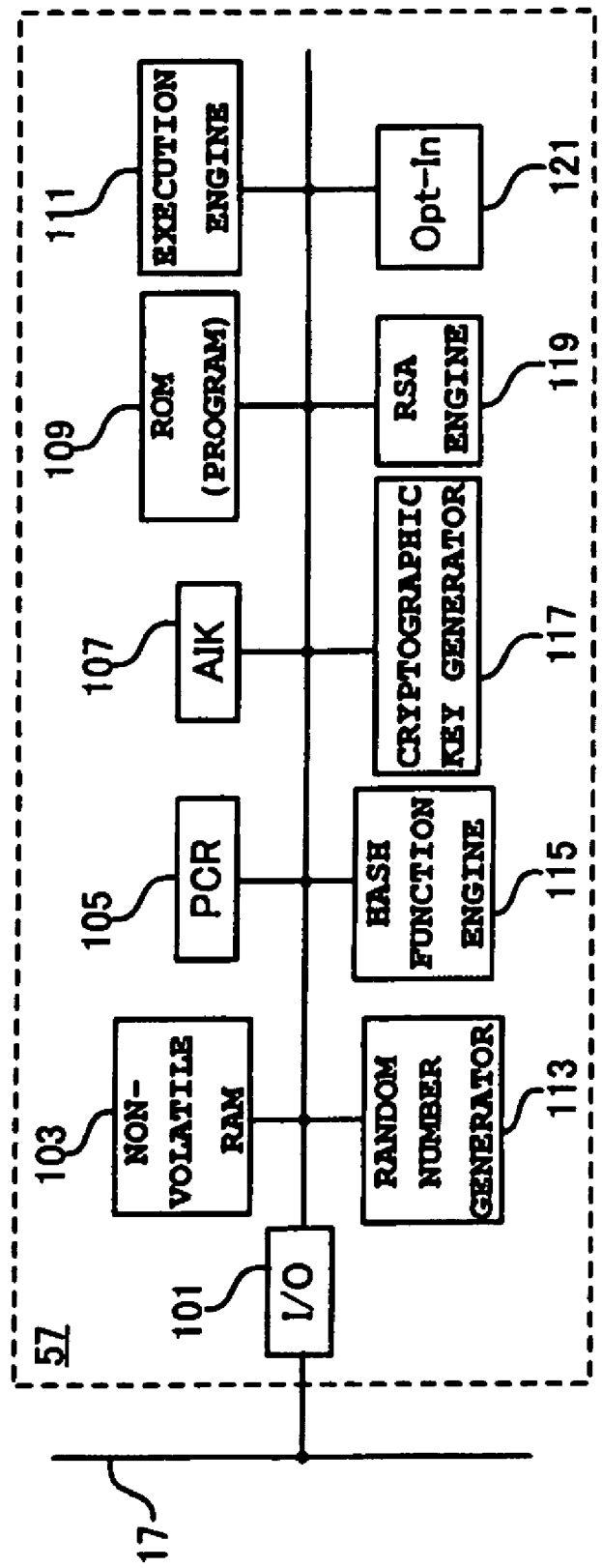
FIG. 2 is a diagram showing the internal configuration of a TPM (Trusted Platform Module)

FIG. 2 is a diagram showing the internal configuration of the TPM (Trusted Platform Module) 57 which is a module for strengthening the security of the PC 10 according to the embodiment of the present invention. The TPM 57 is manufactured and mounted on a PC based on a specification prepared by the TCG (Trusted Computing Group). The TPM 57 exchanges data with the LPC bus 17 via an I/O 101. In a non-volatile RAM 103, there are stored a key used for authentication of a platform and a user, and the like. In this embodiment, a salt value database to be described later is also stored here. A PCR (Platform Configuration Register) 105 is a register for holds platform state information (software measurements). An AIK (Attestation Identity Key) 107 is used to authenticate a platform and used to add a digital signature to data inside the TPM 57.

Various programs used for authentication of a platform and a user and the like are stored in a ROM 109 and executed by an execution engine 111 which includes a processor and a volatile RAM. In addition, the TPM 57 is also provided with a random number generator 113 for generating a random number, a hash function engine 115 for executing a cryptographic hash function which is a one-way function used for encryption, a PKI engine 119 for electronically signing an cryptographic key generated by a cryptographic key generator 117 and an Opt-In 121 for preventing the PC 10 from being used at an unintended place. In this embodiment, a password management program to be described later is also stored in the ROM 109. The content stored in the non-volatile RAM 103 can be referred to by the execution engine 111, and it is not directly accessed by the CPU 11.

Figure 3:
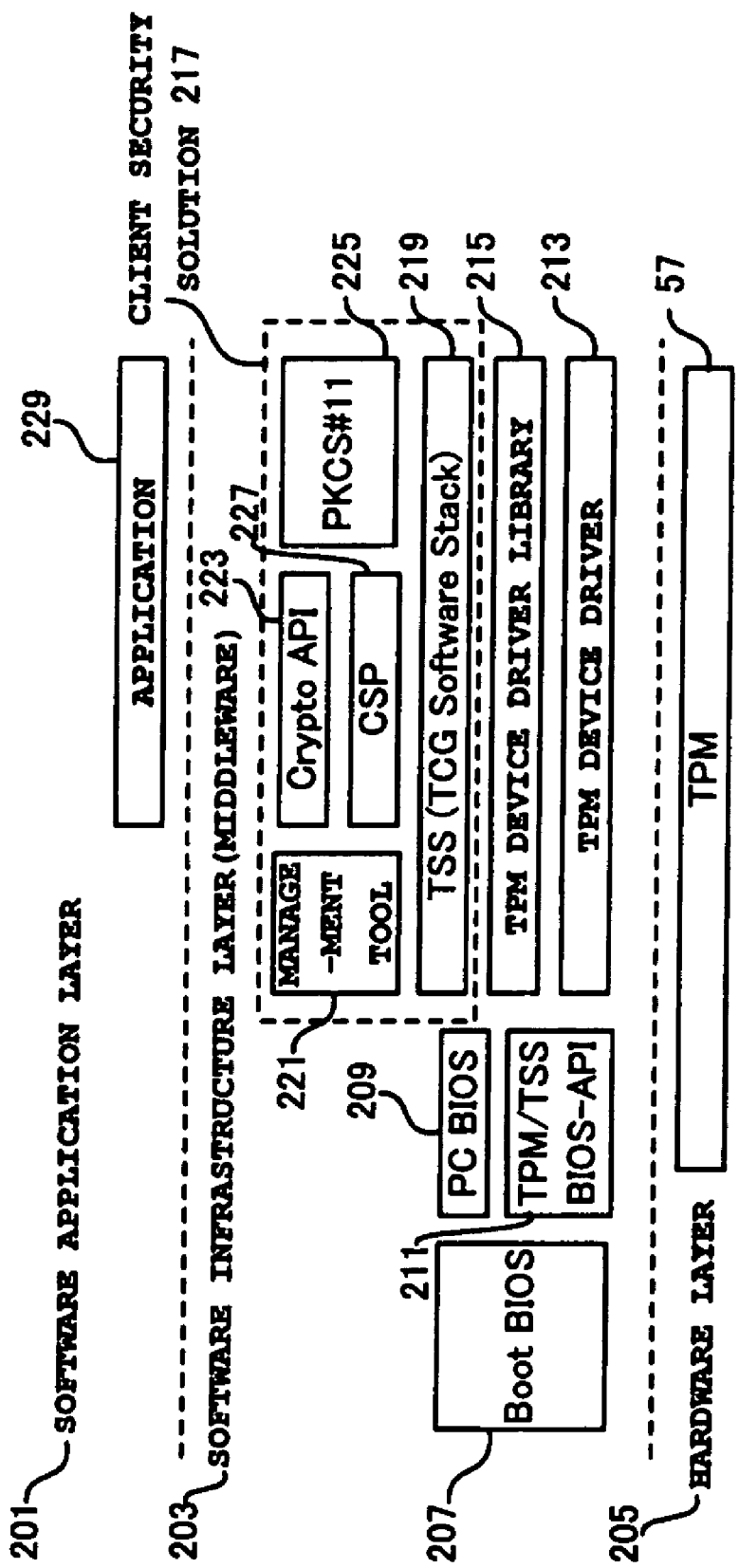
FIG. 3 is a conceptual diagram of a TSS (TCG Software Stack)

FIG. 3 is a conceptual diagram of a TSS (TCG Software Stack). The TPM 57 is associated with the PC 10 as hardware and constructs an environment in the PC 10 which is reliable from a hardware aspect, and it is also possible to use the function of the TPM 57 from application software via a driver. The TSS is defined by the TCG as a software stack for application software to use the TPM 57. By defining three layers, that is, a software application layer 201, a software infrastructure (middleware) layer 203 and a hardware layer 205, the TPM 57 belonging to the hardware layer is stored in the BIOS flash ROM 47 and can be directly operated from a Boot BIOS 207 which is activated first when the PC 10 is powered on. The TPM 57 can be also operated from a PC BIOS 209 which is also stored in the BIOS flash ROM 47 to make system settings, via a TPM/TSS BIOS API 211.

For the Windows®, a device driver 213 compatible with the TPM 57 and a library 215 for using the device driver 213 are provided on the software infrastructure (middleware) layer 203. A client security solution 217 is also provided which is an application operating on the device driver 213 and the library 215 and which provides functions, such as user authentication, encryption and protection of an electronic certificate, for common application software 229 such as Internet Explorer( and Outlook(. The client security solution 217 includes a TSS 219, which is a standard software stack, a management tool 221 for making settings for the TPM and the like, and Crypto API 223 by Microsoft Corporation, which is a standard cipher API, PKCS#11 227 by RSA Security Corporation, other CSPs (Crypto Service Providers) 227, and the like. The application software 229 can use these APIs to pass processing related to user authentication and encryption to the TPM 57 and to execute the processing. Of course, such processing is performed when the platform and the user have been correctly authenticated. Therefore, even if an OS different from the Windows® which essentially operates on the PC 10 is activated, it cannot execute the processing.

Figure 4:
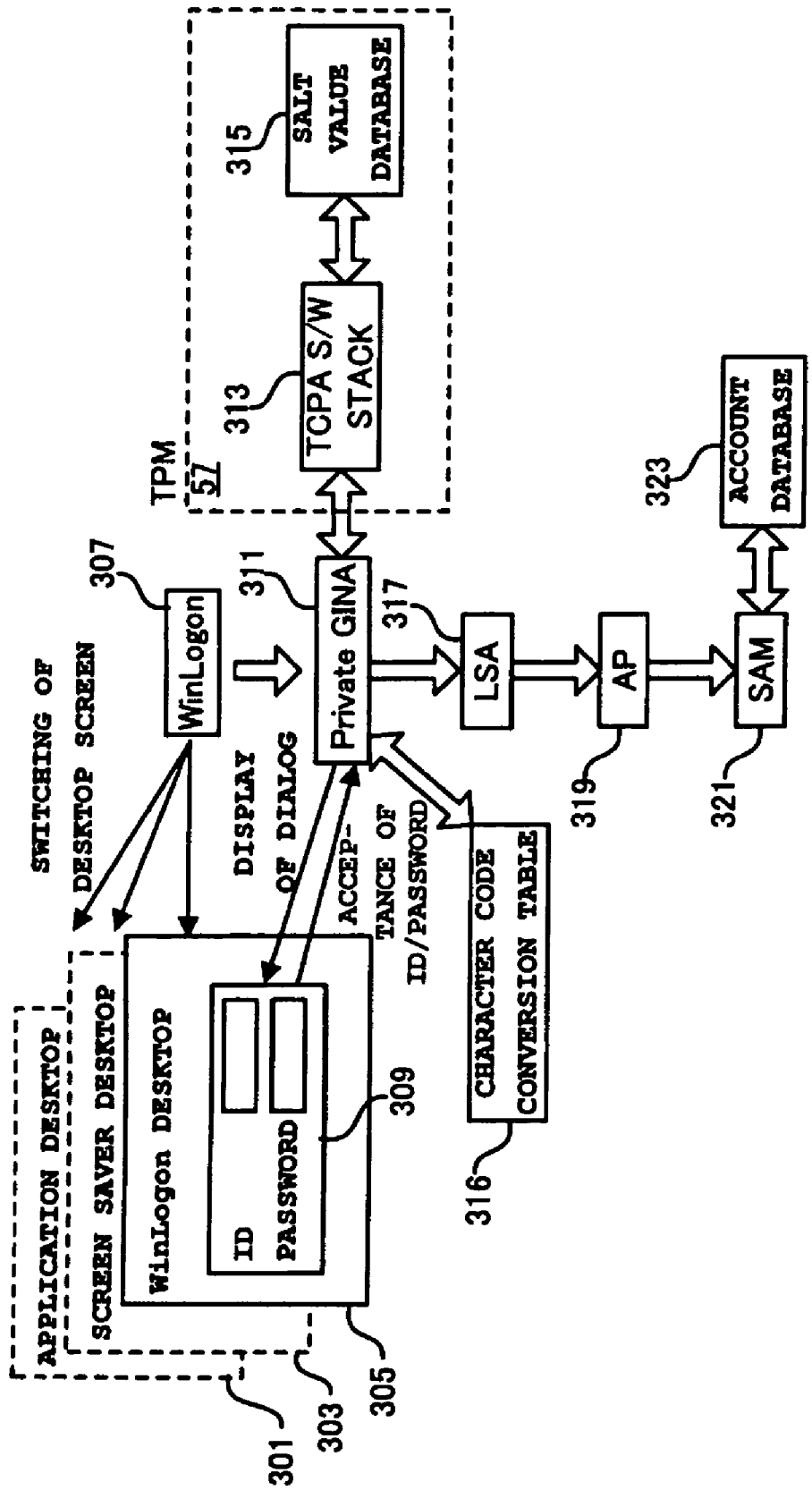
FIG. 4 is a conceptual diagram showing a user logon mechanism in the first embodiment.

FIG. 4 is a conceptual diagram showing a user logon mechanism in this embodiment. When the PC 10 is powered on, the Boot BIOS 207 and the PC BIOS 209 stored in the BIOS flash ROM 47 are read and executed first by the CPU 11, and a self test and initial setting for the hardware mounted on the PC 10 are performed. After that, the Windows® installed in an HDD 39 is read and executed by the CPU 11. When the Windows® is activated, three desktop screens, that is, an application desktop 301, which is a screen to be usually displayed when a user is working on the OS, a screen saver desktop 303 for displaying a screen saver, a WinLogon desktop 305 for displaying a logon screen are created. A WinLogon 307 displays the WinLogon desktop 305 among them on the display 25.

On the WinLogon desktop 305, a dialog 309 for inputting a user ID and an authentication password (hereinafter simply referred to as a password) is displayed by a private GINA 311. The private GINA 311 is a GINA which has been customized for this embodiment and registered as a component of Windows®. When a user inputs a user ID and a password in the dialog 309 via the keyboard 55, the inputted user ID and password are passed from the private GINA 311 to the execution engine 111 in the TPM 57 via the TSS 219 and the device driver 213. In the execution engine 111, processing to be described later is executed by the password management program read from the ROM 109. Furthermore, the private GINA 311 is also provided with a conversion table 316 for converting a character string from ASCII codes to UNICODES. The conversion table 316 includes a UNICODE character array table.

Figure 5:
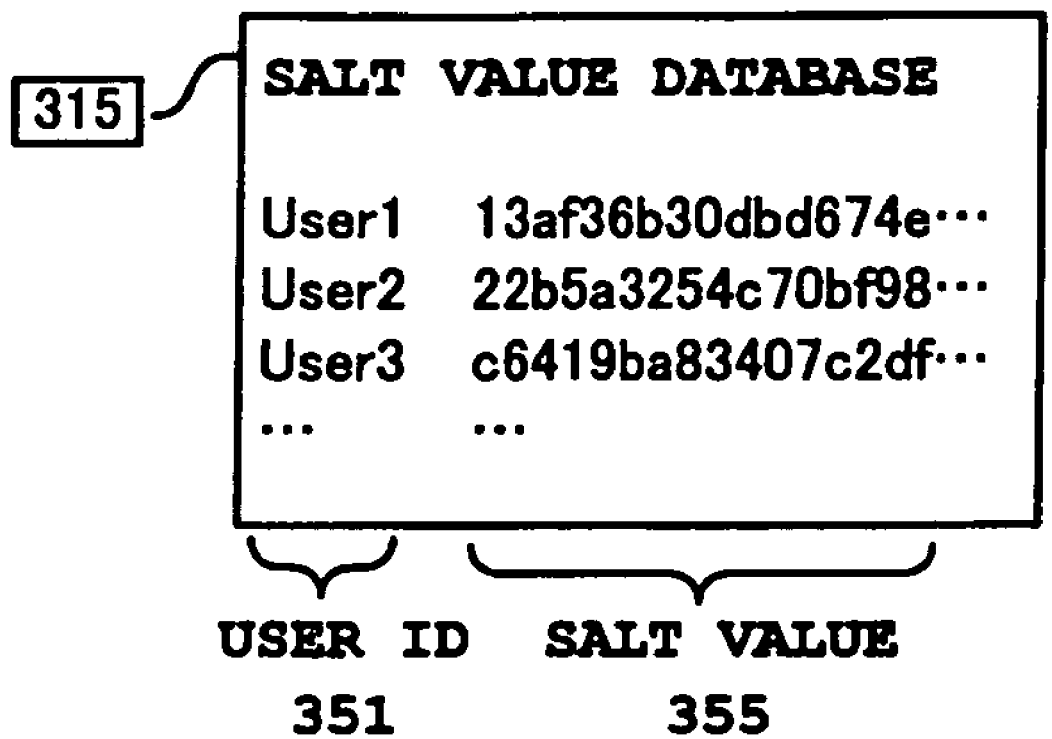
FIG. 5 is a diagram showing the data configuration of a salt value database.
Figure 6:
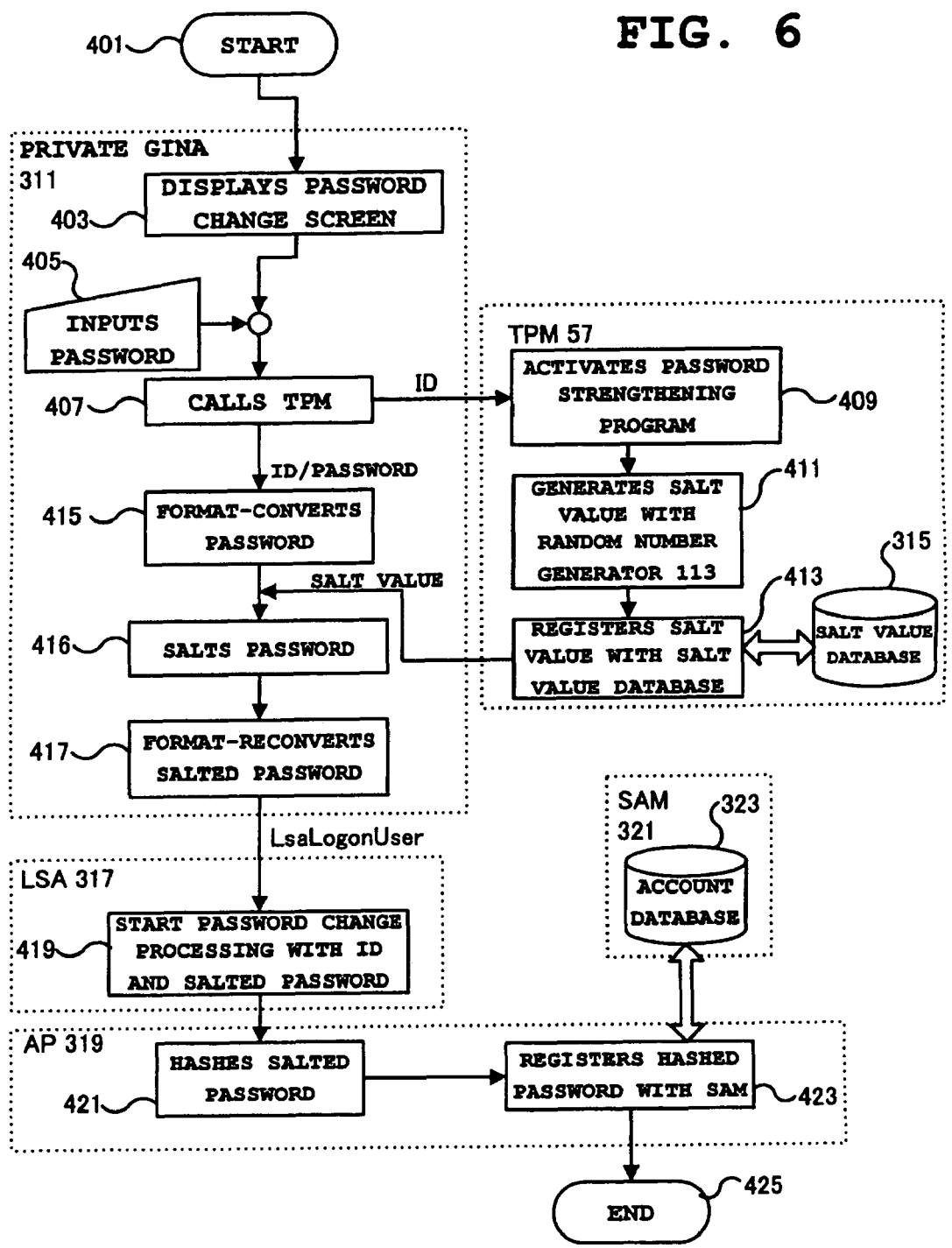
FIG. 6 is a flowchart showing the operation performed when a password is registered in the first embodiment.

FIG. 5 is a diagram showing the data configuration of a salt value database 315 stored in the non-volatile RAM 103 in the TPM 57. A salt value 355 corresponding to a user ID 351 is stored. FIG. 6 is a flowchart showing the operation performed when a password is registered in this embodiment. When password change processing is called while a certain user has normally logged on (block 401), the WinLogon 307 switches the screen displayed on the display 25 to the WinLogon desktop 305, and the private GINA 311 displays the dialog 309 for inputting a changed password on the desktop screen (block 403). When the user inputs a changed password in one-byte alphanumeric characters of ASCII codes into the dialog 309 (block 405), the private GINA 311 calls the TPM 57 and passes the user ID of the user who has logged on to the TPM 57 (block 407).

Receiving the user ID, the TPM 57 calls the password management program stored in the ROM 109 inside the TPM 57 to the execution engine 111 (block 409), generates a random number by the random number generator 113 (block 411), and sets the generated random number as a salt value. The user ID and the corresponding salt value are stored in the non-volatile RAM 103 inside the TPM 57 as the salt value database 315 (block 413). The salt value is passed to the private GINA 311. At this and previous stages, the password is in one-byte alphanumeric characters described in ASCII codes. Therefore, the private GINA 311 format-converts the password to UNICODE data (block 415). A UNICODE is constituted by two to four bytes, and the resistance to a dictionary attack is strengthened by the increased number of digits in comparison with a one-byte ASCII code. Furthermore, the UNICODE data is salted with the use of the salt value passed from the TPM 57 to generate a password constituted only by UNICODE characters (block 416). The data obtained by salting the UNICODE data is not necessarily constituted only by UNICODE characters. Therefore, format-reconversion is performed so that all the data is constituted only by UNICODE characters (block 417). Methods for the format conversion, the salting and the format-reconversion will be described next.

Figure 7:
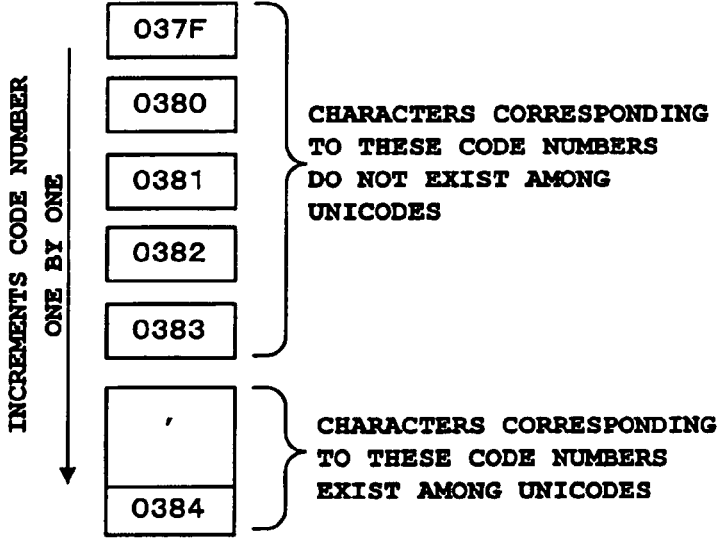
FIG. 7 is a conceptual diagram showing salting of a password.

FIG. 7 is a conceptual diagram showing salting of a password in this embodiment. Salting of a password is performed by inputting a password and a salt value in a particular function. For example, a simple logical function such as (inputted password)XOR(salt value)=(salted password) may be used. When XOR is used, the number of digits of the salt value must be the same as that of the inputted password. Alternatively, a one-way function such as a cryptographic hash function may be used. When a password of one-byte alphanumeric characters described in ASCII codes is converted to UNICODE data, the number of bits is doubled. For example, if a password before being salted is "abc" of one-byte alphanumeric characters, this character string is expressed as "61 62 63" in ASCII codes as shown in FIG. 7(A), while it is expressed as "0061 0062 0063" in UNICODES as shown in FIG. 7(B).

If, for the password which has been format-converted to UNICODE data shown in FIG. 7(B), the salt value with the same number of digits which has been passed from the TPM 57 is, for example, "1234 5678 9ABC" as shown in FIG. 7(C), then a salted password obtained by (password)XOR(salt value)=(salted password) is "1255 561A 9ADF" as shown in FIG. 7(D). When this is applied to the UNICODE character array (UTF-16) with the use of the conversion table 316, all of the "1255", "561A" and "9ADF" are characters existing in the UNICODE character array. However, "1255" is a character indicating a syllable of Ethiopian (Ethiopic syllable QHE), and "561A" and "9ADF" are kanjis mainly used in Chinese (CJK Unified Ideographs). That is, a meaningless character string is obtained in which characters of different languages are mixed, and there is never such a character string especially in a usage-frequency-order dictionary used for a dictionary attack. Accordingly, it is extremely difficult to identify a salted password as shown in FIG. 7(D) by a dictionary attack.

If the salted UNICODE data includes a character which does not exist in the UNICODE character array table included in the conversion table 316, then format-reconversion is performed so that the data is constituted only by characters existing in the UNICODE character array table. Specifically, the code number of the character which does not exist in the UNICODE character array table is incremented or decremented one by one so that the character is replaced with a character of any code number which exists in the UNICODE character array. For example, as shown in FIG. 7(E), the character corresponding to the code number "037F" does not exist in the UNICODE character array table. In this case, the code number is incremented one by one, and a code number "0384" (a symbol called TONOS in Greek) which is a code number existing in the UNICODE character array table and found first by the increment is substituted for the code number. To the contrary, a method may be adopted in which the code number is decremented. Alternatively, a method may be adopted in which the character corresponding to a code number on the UNICODE character array table nearest to the code number of the character which does not exist in the UNICODE character array table, in the addition or subtraction direction, is substituted for the code number.

Returning to FIGS. 4 and 6, the user ID and the salted UNICODE data have been passed from the private GINA 311 to an LSA 317 via LsaLogonUser through the processing heretofore. It is specified by specifications by Microsoft Corporation that a password to be accepted by LsaLogonUser is described as UNICODE data. However, since the data obtained by salting UNICODE data is constituted only by characters existing among UNICODES as describe above, the data can be inputted in the LSA 317 without a problem. The LSA 317 starts password change processing for the user on the local computer and passes the user ID and a changed password to an AP 319 (block 419). The AP 319 hashes the salted UNICODE data password received from the LSA (block 421), and records the user ID which has also been received from the LSA and the hashed, changed password to a database 323 via an SAM 321 (block 423). When recording of the changed password is completed (block 425), the WinLogon 307 switches the desktop screen displayed on the display 25 from the WinLogon desktop 305 to the application desktop 301.

Figure 8:
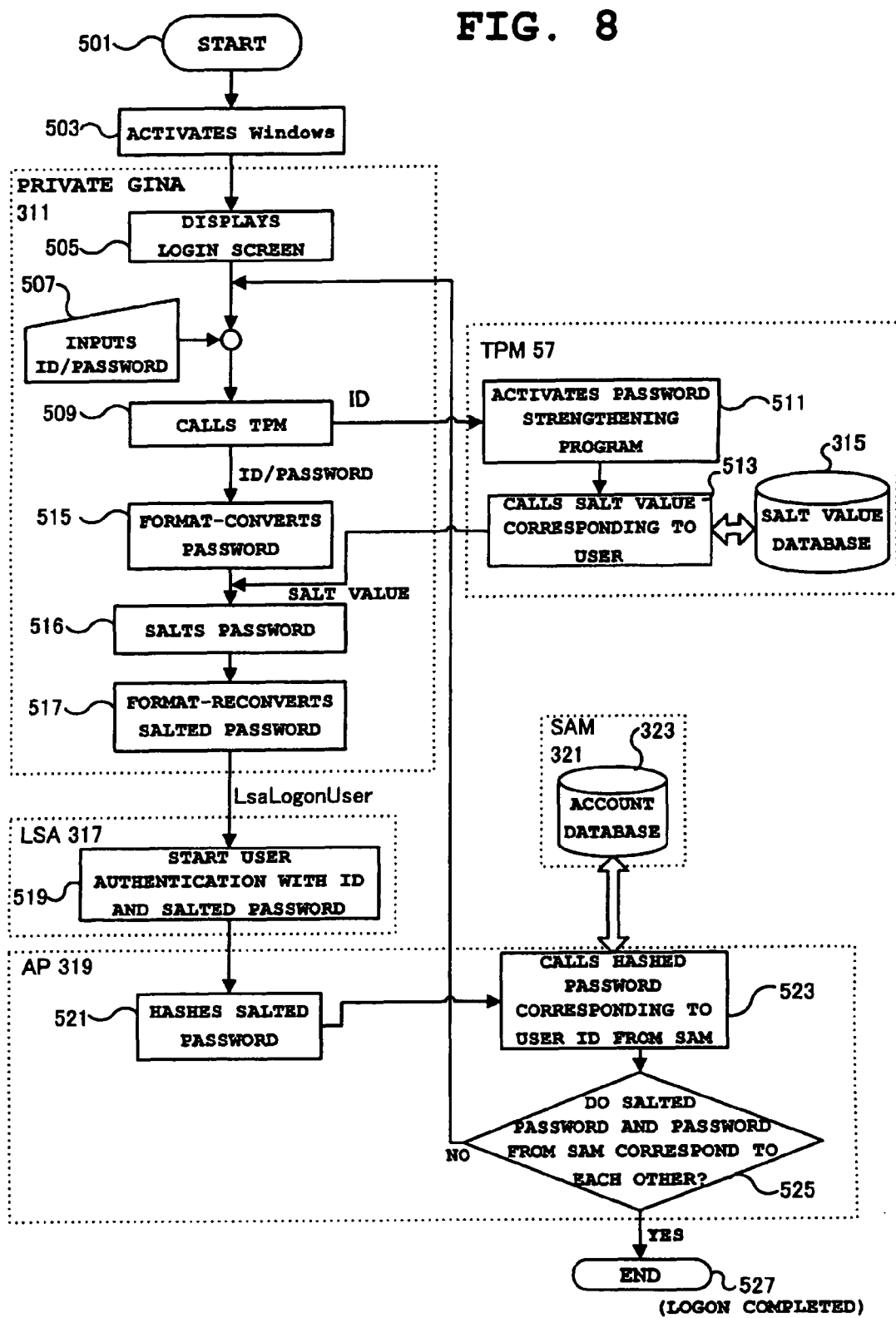
FIG. 8 is a flowchart showing the operation performed when a user is authenticated in the first embodiment.

FIG. 8 is a flowchart showing the operation performed when a user is authenticated in this embodiment. When the PC 10 is powered on (block 501), and Windows is activated (block 503), the WinLogon 307 displays the WinLogon desktop 305 on the display 25, and the private GINA 311 displays the dialog 309 for inputting a user ID and a password on the desktop screen (block 505). When the user inputs a user ID and a password in one-byte alphanumeric characters of ASCII codes in the dialog 309 (block 507), the private GINA 311 calls the TPM 57 and passes the inputted user ID to the TPM 57 (block 509).

Receiving the user ID, the TPM 57 calls the password management program stored in the ROM 109 inside the TPM 57 to the execution engine 111 (block 511) and calls a salt value corresponding to the user ID inputted from the salt value database 315 (block 513). The called salt value is passed to the private GINA 311. Then, the private GINA 311 format-converts the password to UNICODE data (block 515), salts the data with the use of the salt value passed from the TPM 57, and further performs format-reconversion so that all the salted data is constituted only by UNICODE characters (block 517). Since methods for the format conversion, the salting and the format-reconversion are the same as the case of password registration described with reference to FIGS. 6 and 7, description thereof will be omitted.

Through the above processing, the user ID and the UNICODE password generated from the salted UNICODE data are passed from the private GINA 311 to the LSA 317 via LsaLogonUser. The LSA starts password authentication processing for the user on the local computer and passes the user ID and the password to the AP 319 (block 519). The AP 319 hashes the salted UNICODE data password received from the LSA (block 521), and retrieves and calls a password corresponding to the user ID received from the LSA, from the database 323 via the SAM 321 (block 523). The AP 319 compares the password received from the LSA and hashed and the password called from the database 323 (block 525). If they correspond to each other, the AP 319 determines that the user is an authorized user and completes the user authentication (block 527). The WinLogon 307 switches the desktop screen displayed on the display 25 from the WinLogon desktop 305 to the application desktop 301. If the compared passwords do not correspond to each other at block 525, then input of a user ID and a password at block 507 is restarted.

As seen from the above description, in this embodiment, the processing of Windows related to user logon is not changed except that the GINA is customized and configured as the private GINA 311. By using the TPM 57, it is possible to prevent an attacker from acquiring a salt value required for salting a password. Thereby, the password stored in the database 323 is difficult to be identified by a dictionary attack, as described before. Of course, the password a user inputs is a conventional one-byte alphanumeric character password described in ASCII codes.

Figure 9:
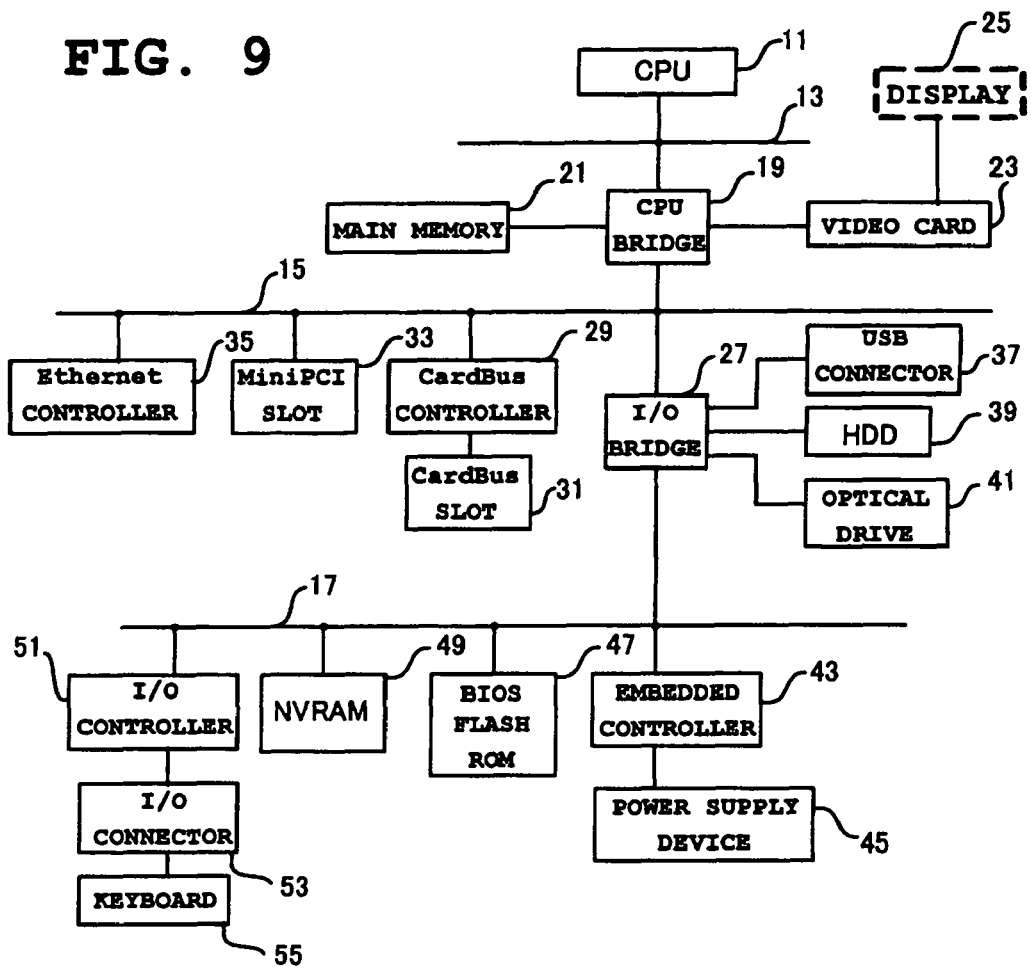
FIG. 9 is a schematic block diagram of a PC according to a second embodiment.

FIG. 9 is a schematic block diagram showing the system configuration of a PC 10' according to a second embodiment of the present invention. The configuration of the PC 10' is different from the PC 10 according to the first embodiment in only one point. It is that the TPM 57 provided for the PC 10 does not exist, and an NVRAM 49 which is not provided for the PC 10 is connected to the LPC bus 17. The NVRAM 49 is a non-volatile RAM backed up by a battery so that data does not disappear even when the PC 10' is powered off, and the details thereof will be described later. Except for this point, the other blocks of the configuration of the PC 10' are the same as those of the PC 10. Therefore, the same reference numerals are given, and description thereof will be omitted.

FIG. 10 shows the internal configuration of a BIOS flash ROM 47, the NVRAM 49 and a main memory 21 in the second embodiment of the present invention. The BIOS flash ROM 47 shown in FIG. 10(A) is a non-volatile memory in which the stored content can be electrically rewritten. In the BIOS flash ROM 47, there are stored a system BIOS (SSO Shell BIOS) 601, which is a basic program used for activation and management of the system, various utilities 603, which are software for managing operation environment such as a power source and temperature, a POST (Power-On Self Test) 605, which is software for performing a hardware test when the PC 10' is activated, a password strengthening system 607 according to the present invention, a random number generator 609 for generating a random number, an SMI handler 611 for causing a CPU 11 to operate in the SMM, an INT13H handler 613 for accessing an HDD 39, and the like. The random number generator 609 may be implemented as software or as hardware.

The NVRAM 49 shown in FIG. 10(B) is a RAM backed up by a battery so that data does not disappear even when the PC 10' is powered off. The NVRAM 49 can be read/write protected. When it is read/write protected, writing in and reading from the NVRAM 49 from the outside is disabled. In the NVRAM 49, there are stored setting information 615 about the device controller of the PC 10' and salt value data 617 for each user. The content of the setting information 615 is mainly activation order and the drive numbers of disk devices, parameters about how to connect each of peripheral equipment and about data transfer, and the like. In the salt value data 617, a password 353 and a salt value 355 corresponding to a user ID 351 are stored, similarly to the first embodiment described with reference to FIG. 5. The salt value data 617 can be accessed only by the system BIOS 601, and it is impossible to refer to the stored content from Windows or other OS's. The storage area for the salt value data 617 includes a temporary storage area 618 for temporarily storing a user ID and a password inputted by a user and a salt value corresponding to the user.

In the main memory 21 shown in FIG. 10(C), an area as an SMRAM (system management RAM) 619 is secured, in addition to a user area 621 used by the ordinary operation of the PC system. When the CPU 11 enters the SMM by the SMI handler 611 being called from the system BIOS 601, the CPU 11 performs single task operation, and any interruption is disabled. The SMRAM area 619 can be exclusively used only by the CPU 11 operating in the SMM. Therefore, while the CPU 11 is operating in the SMM, a program other than the program for a single task operating under the control of the system BIOS 601 never operates, and the SMRAM area 619 is never accessed by a process other then the program.

Figure 11:
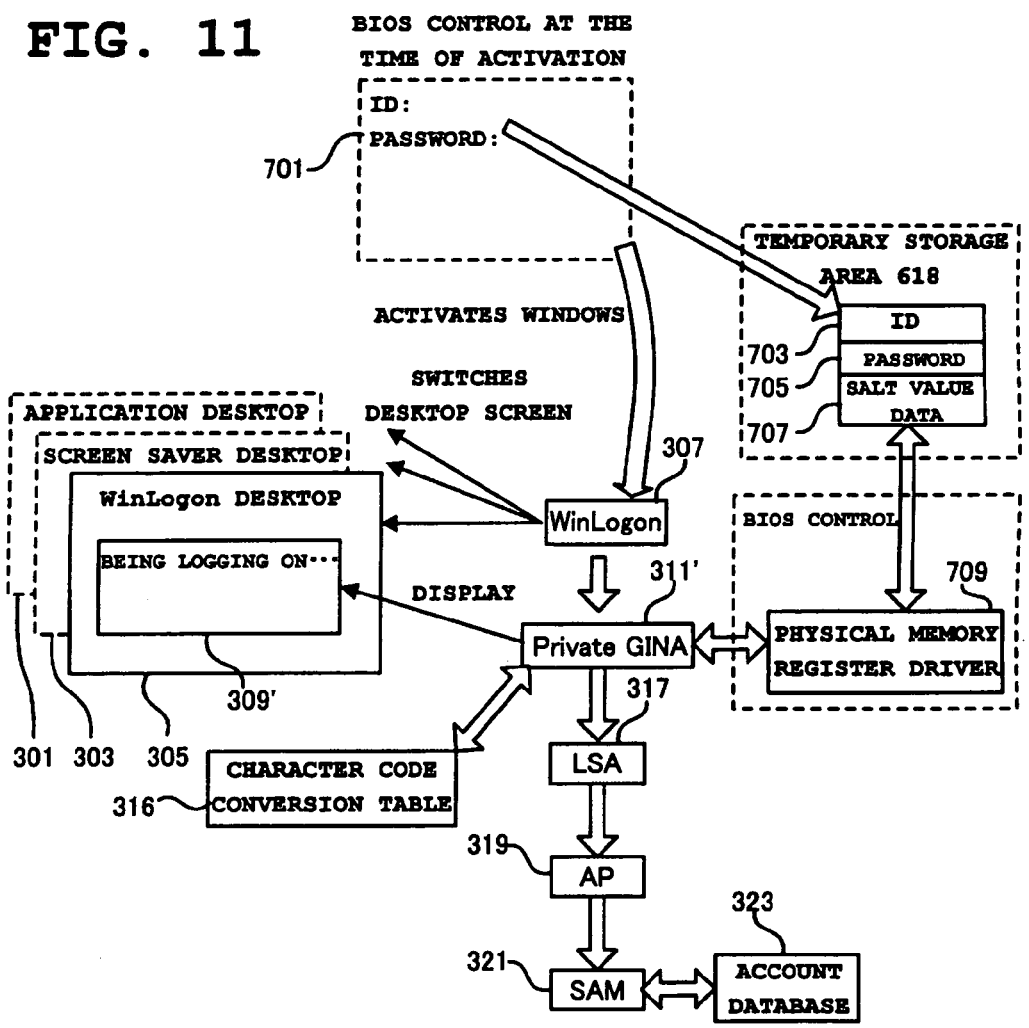
FIG. 11 is a conceptual diagram showing a user logon mechanism in the second embodiment.

FIG. 11 is a conceptual diagram showing a user logon mechanism in this embodiment. When the PC 10' is powered on, the system BIOS 601 stored in the BIOS flash ROM 47 is read by the CPU 11 and executed first, and a self test and initial setting for the hardware mounted on the PC 10' are performed. After that, a prompt 701 for inputting a user ID and a password is displayed by the password strengthening system 607 still under the control of the system BIOS 601. The inputted user ID 703 and password 705 are stored in the temporary storage area 618 in the storage area for the salt value data 617. Furthermore, processing to be described later is executed for the user ID and the password by the password strengthening system 607, and a salt value 707 (the details of which will be described later) obtained as a result of the processing is also stored in the temporary storage area 618.

When the control by the system BIOS 601 is completed, the Windows installed in the HDD 39 is read by the CPU 11 and executed. When the Windows is activated, three desktop screens, that is, an application desktop 301, which is a screen to be usually displayed when a user is working on the Windows, a screen saver desktop 303 for displaying a screen saver, a WinLogon desktop 305 for displaying a logon screen are created. A WinLogon 307 displays the WinLogon desktop 305 among them on the display 25. On the WinLogon desktop 305, a dialog 309' indicating that logon is being performed is displayed by a private GINA 311'. The private GINA 311' is a GINA customized for this embodiment and registered as a component of the Windows. Meanwhile, the private GINA 311' reads the user ID, the password and the salt value stored in the temporary storage area 618 via a physical memory register driver 709 and performs subsequent processing related to logon.

The physical memory register driver 709 is a module for exchanging information between the system BIOS 601 and the Windows and installed in a system file of the Windows as a kernel mode driver. It is impossible for the system BIOS 601 to interpret a logical address of the main memory 21 managed by the Windows. However, the physical memory register driver 709 can keep a particular physical address on the main memory 21, call the SMI handler 611 and issue an SMI via a register of the CPU 11 with the use of an I/O command to communicate the physical address specified by the register of the CPU 11 to the system BIOS 601. Acquiring control, the system BIOS 601 stores requested data in the communicated physical address, and then terminates the operation of the CPU 11 in the SMM. Thereby, the data can be passed to the Windows. The physical address on the main memory 21 stated here may be within the SMRAM area 619 or within the user area 621. The blocks other than those described here are the same as those in the first embodiment described with reference to FIG. 4. Therefore, the same reference numerals are given, and description thereof will be omitted.

Figure 12:
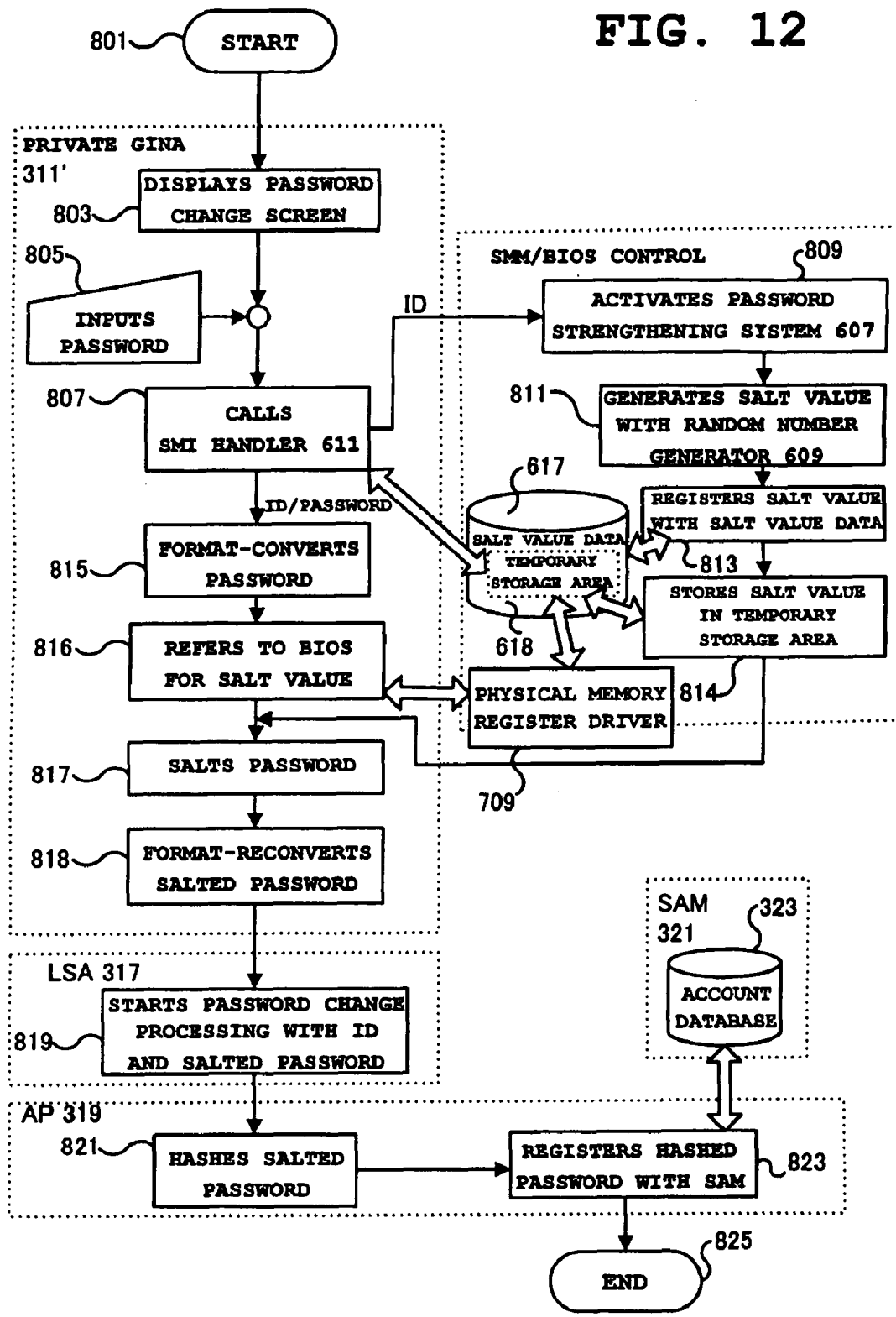
FIG. 12 is a flowchart showing the operation performed when a password is registered in the second embodiment.

FIG. 12 is a flowchart showing the operation performed when a password is registered in this embodiment. When password change processing is called while a certain user has normally logged on (block 801), the WinLogon 307 switches the screen displayed on the display 25 to the WinLogon desktop 305, and the private GINA 311' displays the dialog 309 for inputting the user's changed password on the desktop screen (block 803). When the user inputs a changed password in one-byte alphanumeric characters into the dialog 309 (block 805), the private GINA 311' calls the SMI handler 611 and causes the CPU 11 to operate in the SMM. The user ID of the user who has logged on is stored in the temporary storage area 618 (block 807).

The CPU 11 which has entered the SMM and is operating under the control of the system BIOS 601 calls the password strengthening system 607 stored in the BIOS flash ROM 47 (block 809). The password strengthening system 607 receives the user ID from the SMRAM area 619, generates a random number with the random number generator 609 (block 811), and sets the generated random number as a salt value. The user ID and the salt value corresponding thereto are stored in the NVRAM 49 as salt value data 617 (block 813). The changed password and the salt value are stored in the temporary storage area 618 (block 814), and the operation of the CPU 11 in the SMM ends. Under the control of the Windows again, the private GINA 311' format-converts the password to UNICODE data (block 815), and it refers to the temporary storage area 618 for the salt value and receives it via the physical memory register driver 709 (block 816). Then, with the use of the salt value which the private GINA 311' has received by referring to the temporary storage area 618, the password is salted (block 817), and furthermore, format-reconversion is performed so that all the salted data is constituted only by UNICODE characters (block 818). Since methods for the format conversion, the salting and the format-reconversion are the same as those in the first embodiment described with reference to FIGS. 6 and 7, description thereof will be omitted.

Through the above processing, the user ID and the UNICODE password generated from the salted UNICODE data are passed from the private GINA 311' to an LSA 317 via LsaLogonUser. Subsequently, similarly to the first embodiment described with reference to FIG. 6, the LSA 317 starts password change processing for the user on the local computer and passes the user ID and the changed password to the AP 319 (block 819). The AP 319 hashes the salted UNICODE data password received from the LSA (block 821), and stores the user ID which has also been received from the LSA and the hashed, changed password in the database 323 via the SAM 321 (block 823). When recording of the changed password is completed (block 825), the WinLogon 307 switches the desktop screen displayed on the display 25 from the WinLogon desktop 305 to the application desktop 301.

Figure 13:
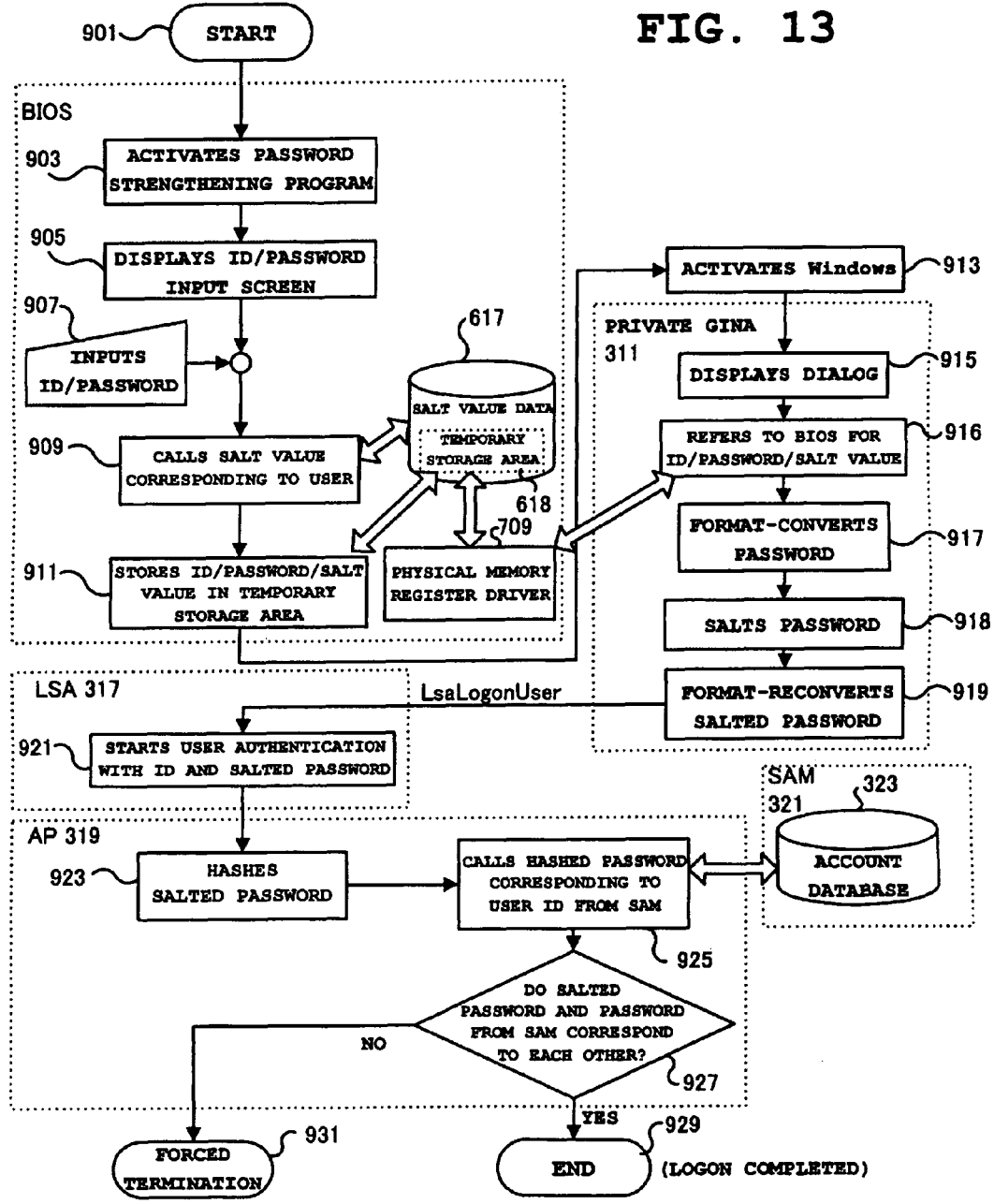
FIG. 13 is a flowchart showing the operation performed when a user is authenticated in the second embodiment.
Figure 14:
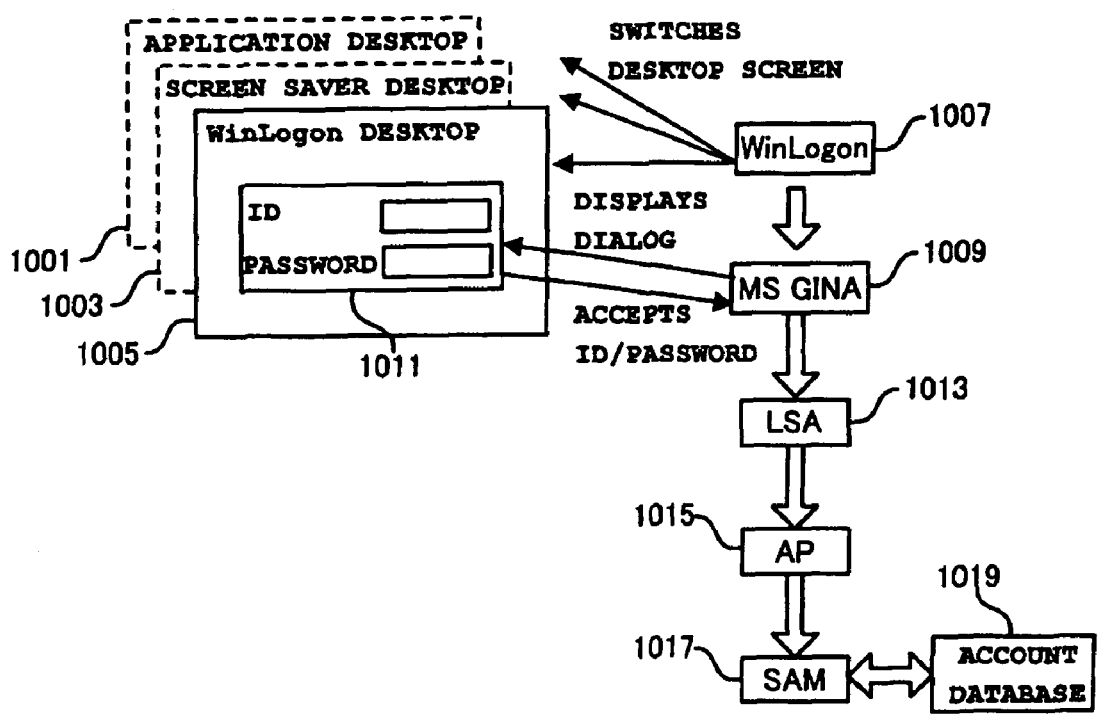
FIG. 14 is a conceptual diagram showing a conventional user logon mechanism.
Figure 15:
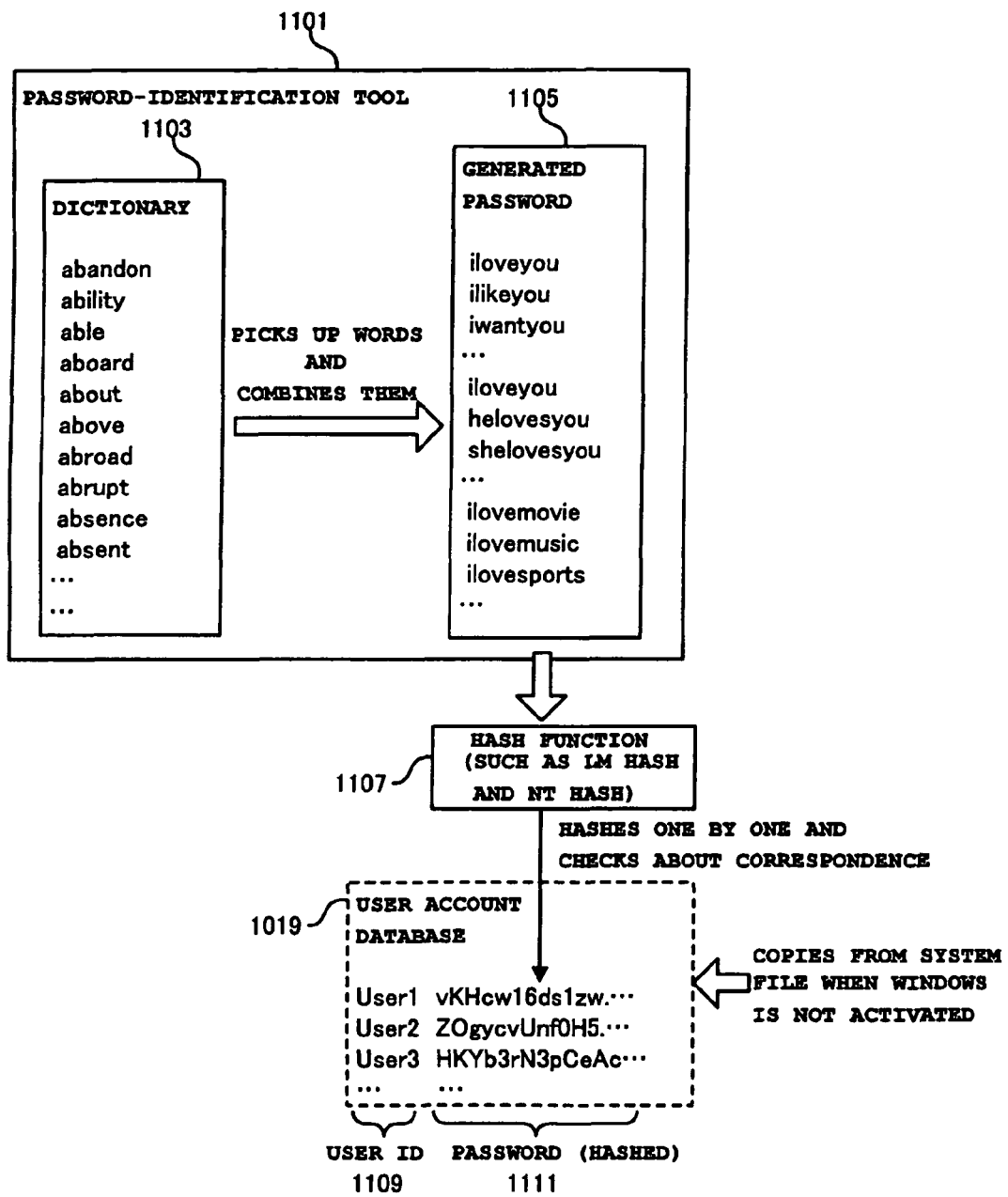
FIG. 15 is a diagram showing a method for performing a dictionary attack against a user account database.

FIG. 13 is a flowchart showing the operation performed when a user is authenticated in this embodiment. When the PC 10' is powered on (block 901), the password strengthening system 607 stored in the BIOS flash ROM 47 is executed under the control of the system BIOS 601 before the Windows is activated (block 903), and the prompt 701 for inputting a user ID and a password is displayed (block 905). When a user inputs a user ID and a password in one-byte alphanumeric characters into the prompt 701 (block 907), the password strengthening system 607 calls a salt value corresponding to the inputted user ID from the salt value data 617 (block 909). The inputted user ID, the password and the salt value are stored in the temporary storage area 618 in the area for salt value data 617 (block 911).

When the Windows installed in an HDD 39 is read and activated by the CPU 11 (block 913), the WinLogon 307 displays the WinLogon desktop 305 on the display 25, and the private GINA 311' displays a dialog 309' indicating that logon is being performed on the desktop screen (block 915). Meanwhile, the private GINA 311' refers to and reads the user ID, the password and the salt value stored in the temporary storage area 618 via a physical memory register driver 709 (block 916). At this stage, the password is in one-byte alphanumeric characters described in ASCII codes. Receiving the user ID, the password and the salt value, the private GINA 311' format-converts the password to UNICODE data (block 917), further salts the UNICODE data with the use of the received salt value (block 918), and further performs format-reconversion so that all the salted data is constituted only by UNICODE characters (block 919). Since methods for the format conversion, the salting and the format-reconversion are the same as the first embodiment described with reference to FIGS. 6 and 7, description thereof will be omitted.

Through the above processing, the user ID and the UNICODE password generated from the salted UNICODE data are passed from the private GINA 311' to the LSA 317 via LsaLogonUser. The LSA 317 starts password authentication processing for the user on the local computer and passes the user ID and the password to the AP 319 (block 921). The AP 319 hashes the salted UNICODE data password received from the LSA (block 923), and retrieves and calls a password corresponding to the user ID received from the LSA, from the database 323 via the SAM 321 (block 925). The AP 319 compares the password received from the LSA and hashed, and the password called from the database 323 (block 927). If they correspond to each other, then the AP 319 determines that the user is an authorized user, and the user authentication is normally completed (block 929). The WinLogon 307 switches the desktop screen displayed on the display 25 from the WinLogon desktop 305 to the application desktop 301. If the compared passwords do not correspond to each other at block 525, then the PC 10' is forcedly terminated (block 931), and block 901 is restarted.

As seen from the above description, in this embodiment, by using the BIOS flash ROM 47 and the NVRAM 49 which are commonly provided for the PC 10', it is possible to prevent an attacker from acquiring a salt value required for salting a password without necessity of special hardware such as the TPM 57. It is not necessary to change software except that the GINA is customized to the Windows and configured as the private GINA 311' and that the physical memory register driver 709 is installed. Of course, similarly to the first embodiment, the password stored in the database 323 is difficult to be identified by a dictionary attack, and a user can input a conventional password.

In the first and second embodiments described above, a private GINA receives a salt value from a TPM or a BIOS and performs format conversion of a password to UNICODE data, salting of the converted UNICODE data, and generation of UNICODE data from the salted UNICODE data. However, an embodiment is also conceivable in which the steps up to the step of salting a password is performed by the processing inside the TPM or on the BIOS, and a private GINA receives a salted UNICODE data password and performs subsequent processing. Then, if the salted UNICODE data includes a character which is not a UNICODE, then the private GINA generates UNICODE data by the method described with reference to FIG. 7.

Furthermore, in the case of the second embodiment in which a salt value is received from the BIOS, such an embodiment is also conceivable in which a password is not inputted from a prompt displayed by the system BIOS which is activated immediately after activation of a PC but is inputted from a dialog displayed by the private GINA after the Windows is activated, similarly to the first embodiment. Furthermore, such an embodiment is also conceivable in which different passwords are inputted from the prompt displayed by the system BIOS and the dialog displayed by the private GINA, respectively.

As a further variation embodiment of the present invention, it is also conceivable that the quite the same conventional GINA is used, and a custom authentication package for receiving a salt value from the TPM or the BIOS and performing format-conversion and salting of a password is provided between the LSA and the AP. Since the actual operation in this case is quite the same except that the private GINA in the first and second embodiments is replaced with the custom authentication package, detailed description thereof will be omitted.

The present invention has been described with the use of the particular embodiments shown in the drawings. However, the present invention is not limited to the embodiments shown in the drawings, and it goes without saying that any known configuration can be adopted as far as the advantages of the present invention can be obtained.

The present invention is particularly though not exclusively applicable to a computer using Windows as the OS.

What is claimed is:

1. A method for a computer to store an authentication password for an operating system (OS) which is constituted by ASCII codes, the method comprising the steps of:
    receiving, at a GINA (Graphic Identification and Authentication) of the OS, the authentication password and a user account;
    the GINA converting the authentication password to UNI-CODE data;
    salting the UNICODE data with a random number to establish a salted string some of which is not necessarily UNICODE characters;
    format-reconverting the salted string to establish a completely UNICODE salted data;
    hashing the completely UNICODE salted data to establish hashed UNICODE data; and
    storing the user account and the hashed UNICODE data in a user account database held by an SAM (Security Account Manager) of the OS.

2. The storage method according to claim 1, wherein the conversion to the UNICODE data includes converting the authentication password to first UNICODE data and salting the first UNICODE data with the random number to generate second UNICODE data.

3. The storage method according to claim 2, wherein the conversion to the UNICODE data includes using a conversion table for mapping which includes code numbers and characters corresponding to the code numbers, if the data obtained by salting the first UNICODE data includes a character which does not exist in the conversion table, replace the character with a character which exists in the conversion table and which has the nearest code number.

4. The storage method according to claim 2, wherein the conversion to the UNICODE data includes using a conversion table for mapping which includes code numbers and characters corresponding to the code numbers, if the data obtained by salting the first UNICODE data includes a character which does not exist in the conversion table, detect a code number which exists in the conversion table by increasing or decreasing the code number of the character which does not exist in the conversion table.

5. The storage method according to claim 1, wherein the random number is stored in a read/write protected non-volatile memory.

6. The storage method according to claim 1, wherein the random number is stored in a non-volatile memory which is accessible only by a BIOS.

7. The storage method according to claim 1, wherein the random number is provided by a TPM (Trusted Platform Module).

8. A method for a computer to store an authentication password for an operating system (OS) which is constituted by ASCII codes, the method comprising the steps of:
    providing a random number for the computer;
    receiving the authentication password and the user account;
    converting the authentication password to UNICODE data;
    salting the UNICODE data with the random number;
    if the salted UNICODE data includes a character with a code number which is not included among UNICODES, a GINA (Graphic Identification and Authentication) of the OS changing the code number and generating UNI-CODE data constituted only by UNICODES;
    hashing the UNICODE data; and
    storing the user account and the hashed UNICODE data in a user account database held by an SAM (Security Account Manager) of the OS.

9. The storage method according to claim 8, wherein the conversion to the UNICODE data and the salting are performed inside a TPM (Trusted Platform Module).

10. The storage method according to claim 8, wherein the conversion to the UNICODE data and the salting are performed by a BIOS.

11. A method for a computer to authenticate each of multiple users with a user account and an authentication password constituted by ASCII codes which have been inputted into the computer on which an operating system (OS) is operating, the method comprising the steps of:

provided a list of random numbers corresponding to user accounts of the respective users for the computer;

providing data related to the users' authentication passwords for a user account database held by an SAM (Security Account Manager) of the OS;

a GINA (Graphic Identification and Authentication) of the OS receiving the user account and the authentication password constituted by ASCII codes;

the GINA acquiring a random number corresponding to the received user account from the list of random numbers and converting the received authentication password to UNICODE data salted with the acquired random number;

hashing the UNICODE data; and an Authentication Package of the OS comparing the hashed UNICODE data with the data related to the users' authentication passwords which is stored in the user account database.

12. The authentication method according to claim 11, wherein the conversion to the UNICODE data includes converting the authentication password to first UNICODE data, salting the first UNICODE data with the random number to generate second UNICODE data, and using a conversion table for mapping which includes code numbers and characters corresponding to the code numbers.

13. A computer mounted with an operating system (OS) which authenticates each of multiple users with a user account and an authentication password constituted by ASCII codes, the computer including a processor executing logic comprising:

storing a list of random numbers corresponding to the respective user accounts;

storing data related to the authentication passwords corresponding to respective user accounts;

receiving a user account and an authentication password;

acquiring a random number corresponding to the received user account from the list of random numbers and converting the received authentication password to UNICODE data salted with the acquired random number;

hashing the UNICODE data; and comparing the hashed UNICODE data and the data related to the authentication passwords stored in storage.

14. The computer according to claim 13, comprising a user account database held by an SAM (Security Account Manager) of the OS and storing data related to the authentication passwords.

15. The computer according to claim 13, wherein the processor converts to UNICODE data using a GINA (Graphic Identification and Authentication) of the OS.

16. A method for a computer to authenticate each of multiple users with a user account and an authentication password constituted by ASCII codes which have been inputted into the computer on which an operating system (OS) is operating, the method comprising the steps of:

providing a list of random numbers corresponding to user accounts of the respective users for the computer;

providing data related to the users' authentication passwords for a user account database held by an SAM (Security Account Manager) of the OS;

receiving the user account and the authentication password;

converting the received authentication password to UNICODE data;

acquiring a random number corresponding to the received user account from the list of random numbers;

salting the UNICODE data with the acquired random number;

if the salted data includes a character with a code number which is not included among UNICODES, a GINA (Graphic Identification and Authentication) of the OS changing the code number and generating UNICODE data constituted only by UNICODES;

hashing the UNICODE data; and an Authentication Package of the OS comparing the hashed UNICODE data with the data related to the users' authentication passwords which is stored in the user account database.

* * * * *